(12) United States Patent
London et al.

(10) Patent No.: US 8,376,369 B2
(45) Date of Patent: Feb. 19, 2013

(54) SEAL WITH SPIRAL GROOVES AND CONTAMINATION ENTRAPMENT DAMS

(75) Inventors: John A. London, Cornelia, GA (US); Robert Scavuzzo, Clermont, GA (US); Alexander Berdichevsky, Farmington Hills, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 358 days.

(21) Appl. No.: 12/711,527

(22) Filed: Feb. 24, 2010

(65) Prior Publication Data
US 2010/0219588 A1 Sep. 2, 2010

Related U.S. Application Data

(63) Continuation-in-part of application No. 11/351,973, filed on Feb. 10, 2006.

(51) Int. Cl.
*F16J 15/32* (2006.01)
(52) U.S. Cl. .......................................... 277/559
(58) Field of Classification Search .................... 277/559
See application file for complete search history.

(56) References Cited

U.S. PATENT DOCUMENTS

| | | | |
|---|---|---|---|
| 2,635,907 A | 4/1953 | Heimbuch | |
| 2,697,623 A | 12/1954 | Mosher | |
| 2,731,284 A | 1/1956 | Chambers, Jr. et al. | |
| 2,736,583 A | 2/1956 | Marvin | |
| 2,736,585 A | 2/1956 | Riesing | |
| 2,736,586 A | 2/1956 | Riesing | |
| 2,743,950 A | 5/1956 | Helfrecht et al. | |
| 2,797,944 A | 7/1957 | Riesing | |
| 3,049,356 A | 8/1962 | Talamonti | |
| 3,356,376 A | 12/1967 | Bradfute et al. | |
| 3,572,734 A | 3/1971 | Holt | |
| 3,822,890 A | 7/1974 | Bourgeois | |
| 3,941,396 A | 3/1976 | Bailey et al. | |
| 3,984,113 A | 10/1976 | Bentley | |
| 3,988,078 A | 10/1976 | Barker | |

(Continued)

FOREIGN PATENT DOCUMENTS

| EP | 0128645 A2 | 12/1984 |
|---|---|---|
| EP | 0286211 A2 | 10/1988 |

(Continued)

OTHER PUBLICATIONS

The Journal of Teflon, vol. 11, No. 1 (Jan.-Feb. 1970), Advances in Radial Lip Seals of "Teflon," pp. 2-4.

*Primary Examiner* — Vishal Patel
(74) *Attorney, Agent, or Firm* — Daniel J. Sepanik, Esq.; Harness, Dickey & Pierce, P.L.C.

(57) ABSTRACT

A dynamic seal utilizes a groove on the active side of the seal to capture a leaked lubricant and pump the lubricant back into the lubricated side of the seal. The groove stops short of the leading edge of the seal that faces the lubricant side forming a static dam between the termination point of the groove and the seal edge. When the fluid pressure within the groove exceeds the opening pressure for the seal lip, the lubricant within the groove is pumped back into the lubricant side of the seal. The groove can have an induction zone wherein the fluid pressure rise is gradual and a booster zone wherein the fluid pressure rise is relatively faster than in the induction zone. The booster zone is disposed adjacent the static dam. Bars are provided across the spiral grooves to prevent contaminants from reaching and becoming trapped in the booster zone.

5 Claims, 5 Drawing Sheets

U.S. PATENT DOCUMENTS

| | | |
|---|---|---|
| 4,008,014 A | 2/1977 | Staebler |
| 4,037,849 A | 7/1977 | Thumm |
| 4,055,106 A | 10/1977 | Frey |
| 4,106,781 A | 8/1978 | Benjamin et al. |
| 4,111,436 A | 9/1978 | Yazawa |
| 4,119,324 A | 10/1978 | Denton et al. |
| 4,132,421 A | 1/1979 | Corsi et al. |
| 4,256,208 A | 3/1981 | Najer et al. |
| 4,274,641 A | 6/1981 | Cather, Jr. |
| 4,344,631 A | 8/1982 | Winn |
| 4,449,717 A | 5/1984 | Kitawaki et al. |
| 4,451,050 A | 5/1984 | Repella |
| 4,487,561 A | 12/1984 | Eiermann |
| 4,501,431 A | 2/1985 | Peisker et al. |
| 4,568,092 A | 2/1986 | Hayashida et al. |
| 4,585,236 A | 4/1986 | Simmons et al. |
| 4,635,947 A | 1/1987 | Hatayama |
| 4,844,484 A | 7/1989 | Antonini et al. |
| 4,845,828 A | 7/1989 | Reed |
| 4,886,281 A | 12/1989 | Ehrmann et al. |
| 4,986,553 A | 1/1991 | Preston et al. |
| 4,995,621 A | 2/1991 | Devouassoux et al. |
| 5,004,248 A | 4/1991 | Messenger et al. |
| 5,009,583 A | 4/1991 | Carlsson et al. |
| 5,118,267 A | 6/1992 | Dollhopf |
| 5,190,440 A | 3/1993 | Maier et al. |
| 5,292,199 A | 3/1994 | Hosbach et al. |
| 5,370,404 A | 12/1994 | Klein et al. |
| 5,509,667 A | 4/1996 | Klein et al. |
| 5,664,787 A | 9/1997 | Fuse et al. |
| 5,692,757 A | 12/1997 | Straub |
| 5,755,446 A | 5/1998 | Dean et al. |
| 5,791,658 A | 8/1998 | Johnston |
| 5,860,656 A | 1/1999 | Obata et al. |
| 5,957,461 A | 9/1999 | Ulrich |
| 6,168,164 B1 | 1/2001 | Toth et al. |
| 6,170,834 B1 | 1/2001 | Vogt |
| 6,357,325 B1 | 3/2002 | Vogt |
| 6,409,177 B1 | 6/2002 | Johnston |
| 6,428,013 B1 | 8/2002 | Johnston et al. |
| 6,520,507 B2 | 2/2003 | Pataille et al. |
| 6,601,855 B1 | 8/2003 | Clark |
| 6,702,293 B2 | 3/2004 | Endo et al. |
| 6,860,486 B2 | 3/2005 | Hacker et al. |
| 6,921,080 B2 * | 7/2005 | Johnen .................. 277/549 |
| 7,004,471 B2 | 2/2006 | Bryde et al. |
| 7,134,669 B2 | 11/2006 | Uhrner |
| 2003/0006563 A1 | 1/2003 | Cater et al. |
| 2003/0098549 A1 | 5/2003 | Mellet et al. |
| 2003/0230850 A1 | 12/2003 | Bruyere et al. |
| 2006/0022414 A1 | 2/2006 | Balsells |
| 2007/0187903 A1 | 8/2007 | Berdichevsky |

FOREIGN PATENT DOCUMENTS

| | | |
|---|---|---|
| EP | 0432287 A1 | 6/1991 |
| EP | 0447766 A2 | 9/1991 |
| EP | 0564153 A1 | 10/1993 |
| EP | 0657641 A2 | 6/1995 |
| EP | 0684413 A1 | 11/1995 |
| EP | 0771398 A1 | 5/1997 |
| EP | 0792426 A1 | 9/1997 |
| EP | 0879977 A2 | 11/1998 |
| EP | 1026428 A2 | 8/2000 |
| EP | 1455122 A1 | 9/2004 |
| JP | 62067372 A | 3/1987 |
| JP | 2000320689 A | 11/2000 |
| JP | 2001165327 A | 12/2002 |
| WO | 9602777 A1 | 2/1996 |
| WO | 9615397 A1 | 5/1996 |

* cited by examiner

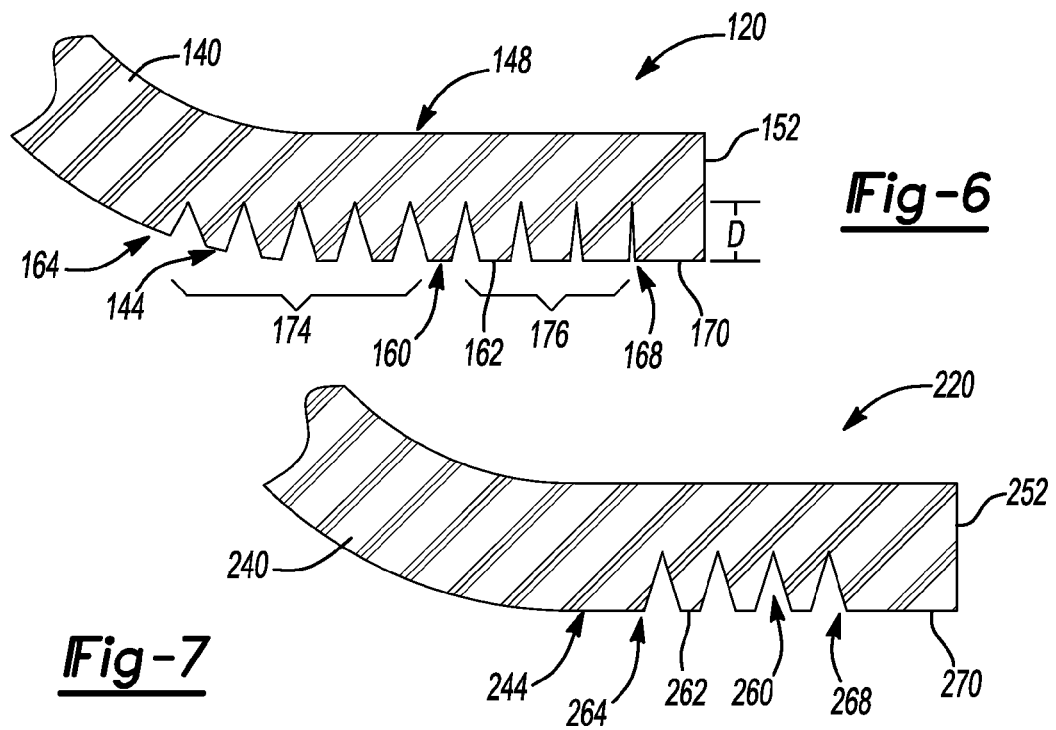
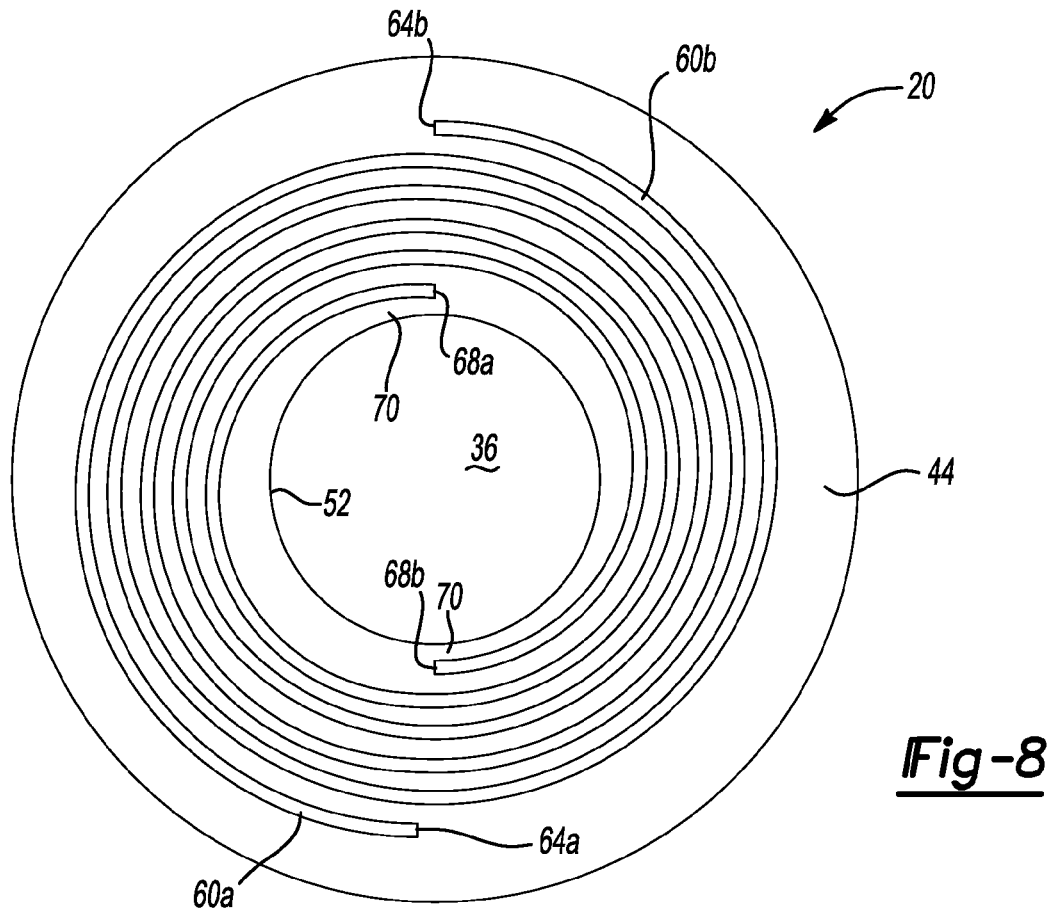

SEAL WITH SPIRAL GROOVES AND CONTAMINATION ENTRAPMENT DAMS

CROSS-REFERENCE TO RELATED APPLICATIONS

This application is a continuation-in-part of U.S. patent application Ser. No. 11/351,973, filed on Feb. 10, 2006. The entire disclosure of the above application is incorporated herein by reference.

FIELD OF THE INVENTION

The present invention relates to seal with spiral grooves and, more particularly, to a seal with spiral grooves and contamination entrapment dams.

BACKGROUND OF THE INVENTION

Rotary shaft seals have been utilized in machinery, the automobile industry, as well as other industries. The seal has an air side and a lubricant side. The seal helps to maintain the lubricant (e.g. oil) on the lubricant side. Lubricant may, however, leak from the lubricated side to the non-lubricated (air) side through the interaction of the active surface of the seal with the shaft. Various arrangements have been devised to capture the leaked lubricant and deliver it back to the sealed side. In one, spiral grooves or built-up ribs (hereinafter collectively referred to as grooves) disposed on the active side of the seal capture the leaked lubricant and hydrodynamically pump the lubricant back into the lubricated side due to relative rotation between the seal and the shaft about which the seal is disposed.

The grooves used to hydrodynamically pump the lubricant are open at the oil side of the seal and communicate with the lubricant therein. Having the grooves open at the oil side of the seal creates potential problems. For example, static oil leaks can develop. Additionally, air leakage during pressurization testing of the machinery on which the seal is being used at the end of the assembly stage can also occur. In an attempt to address these drawbacks, the exit points of the spiral grooves on the oil side have been blocked. Blocking the exit point on the oil side, however, reduces the pump rate so significantly that the seal performance degrades and makes the use of such a seal impractical and/or impossible. Another attempt to address these drawbacks is to block the pumping groove not at the exit point on the inner side, but 2 to 3 loops of the groove toward the air side. Doing so reduces the pump rate also, but not to the extent where the seal performance degrades too much. This blockage, however, does lead to other difficulties. The most pronounced difficulty is oil stagnation close to the exit point. This in turn leads to oil coking in the groove and eventually to seal failure. Accordingly, it would be advantageous to provide a seal that effectively uses grooves to hydrodynamically pump lubricant back to the lubricant side while minimizing and/or eliminating the drawbacks mentioned above.

The seal with a controllable pump rate according to the principle of the present invention advantageously utilizes a groove on the active side or surface of the seal to capture leaked lubricant and hydrodynamically pump the lubricant back into the lubricated side. The groove extends along a portion of the active side of the seal. The groove, however, does not extend to the leading edge of the seal that faces the lubricant side. Rather, the groove stops short of the leading edge thereby forming a static dam or band between the groove and the sealing edge on the lubricant side of the seal. Lubricant that leaks past the sealing edge on the lubricant side is captured in the grooves and directed back toward the lubricant side due to relative rotation between the seal and the shaft on which the seal is disposed. The fluid pressure inside the groove grows until it reaches a critical value wherein the fluid pressure in the groove exceeds the seal lip opening pressure and the lubricant then escapes into the lubricant side of the seal. In some embodiments, the configuration of the groove is such that an induction zone is formed by a portion of the grooves and a booster zone is formed by a different portion of the grooves. The booster zone is adjacent the static dam. The fluid pressure growth is relatively slow in the induction zone and becomes relatively fast in the booster zone.

The use of a static dam in the seal of the present invention advantageously avoids static leakage and problems associated with insufficient fluid flow (coking, carbonization, etc.). Another advantage of the present invention is that some amount of lubricant is always present in the groove prior to the static dam liftoff. This lubricant provides improved seal lip lubrication thereby reducing wear and effectively removing coked lubricant and debris which in turn can extend the seal life.

In one aspect of the present invention, a dynamic seal includes a lubricant side and a non-lubricant side. A sealing portion is operable to engage with and seal against a shaft. The sealing portion includes an active surface communicating with the non-lubricant side and a seal lip at an end thereof. The seal lip faces the lubricant side and defines an opening in which a shaft can be disposed. The active surface is operable to engage with and seal against a shaft disposed in the opening. There is at least one pumping element extending along the active surface and stopping short of the seal lip. The pumping element has a beginning point and a termination point. The pumping element is operable to capture lubricant that leaks past the seal lip and pump the lubricant toward the termination point and back into the lubricant side due to relative rotation between the active surface and a shaft.

In another aspect of the present invention, another dynamic seal is disclosed. The dynamic seal has both a lubricant side and a non-lubricant side. An active surface is operable to seal against a shaft. At least one groove extends along the active surface from the non-lubricant side toward the lubricant side with a portion of the active surface disposed between the groove and the lubricant side. The groove is operable to capture lubricant that leaks between the active surface and the shaft and pump captured lubricant into the lubricant side past the portion of the active surface. A first portion of the groove has a first characteristic. A second portion of the groove has a second characteristic different than the first characteristic. The second portion of the groove is closer to the lubricant side than the first portion of the groove.

In still another aspect of the present invention, a method of returning lubricant that leaks past a dynamic seal on a shaft back to a lubricant side of the seal is disclosed. The method includes: (1) capturing lubricant that leaks past the seal in a groove on an active surface of the seal, the groove stopping short of the lubricant side of the seal; (2) pumping the captured lubricant in the groove back toward the lubricant side of the seal; (3) increasing a fluid pressure in the groove as the groove approaches the lubricant side of the seal; (4) lifting a portion of the seal adjacent the lubricant side off of the shaft with the fluid pressure in the groove; and (5) returning captured lubricant in the groove back to the lubricant side of the seal through a gap between the lifted-off portion of the seal and the shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a first alternate embodiment of the seal of FIG. 1 showing a differing groove configuration;

FIG. 7 is a second alternate embodiment of the seal of FIG. 1 showing a groove configuration wherein no booster zone is utilized;

FIG. 8 is a schematic simplified representation of a top plan view of the active surface of the seal of FIG. 1 showing two distinct grooves extending along the active surface of the seal;

DETAILED DESCRIPTION OF THE PREFERRED EMBODIMENTS

The following description of the preferred embodiment(s) is merely exemplary in nature and is in no way intended to limit the invention, its application, or uses.

Figure 1:
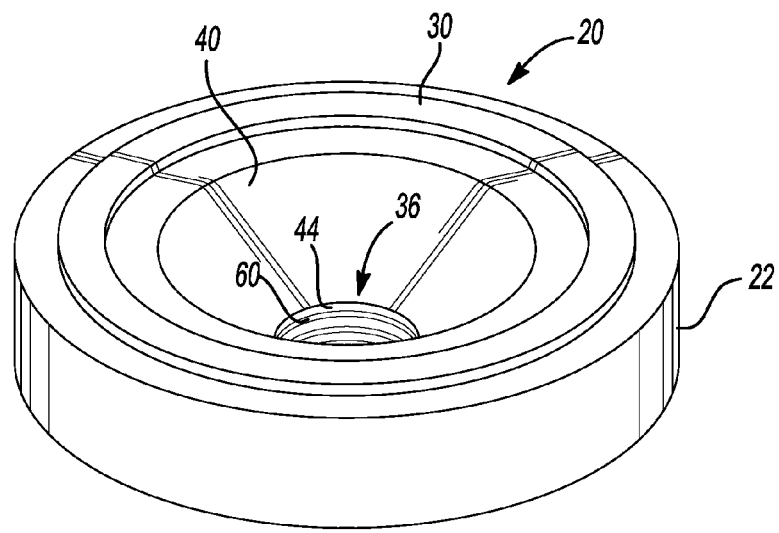
FIG. 1 is a simplified perspective view of the seal of the present invention.
Figure 2:
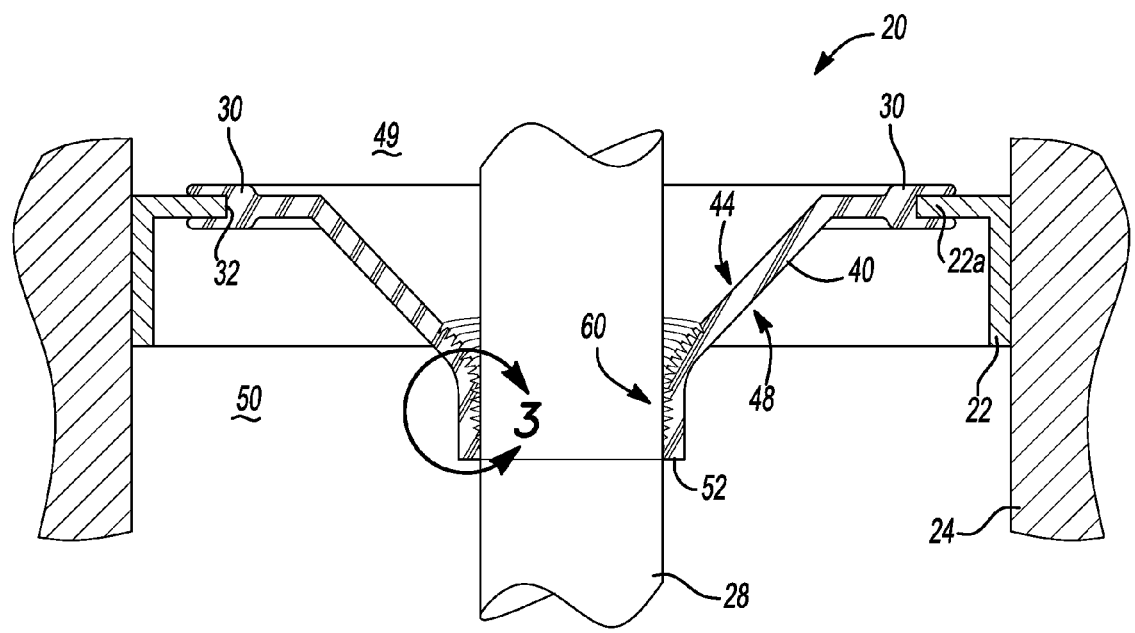
FIG. 2 is a cross-sectional view of the seal of FIG. 1 disposed around a shaft.
Figure 3:
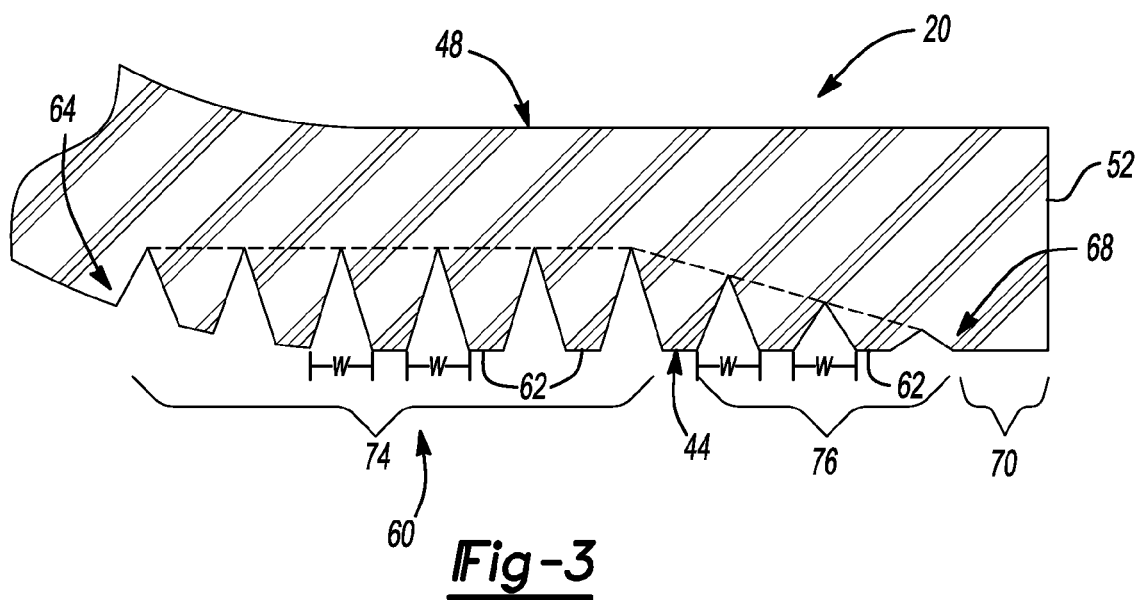
FIG. 3 is an enlarged fragmented cross-sectional view of the active side of the seal within circle 3 of FIG. 2.

With reference to FIGS. 1-3, a dynamic seal 20 according to the preferred embodiment of the present invention is shown. Seal 20 is mounted to a casing 22 which is disposed in a fixed housing 24 (best shown in FIG. 2) in a manner which is well known in the art. Seal 20 engages a rotary shaft 28 and provides a sealed relationship between rotary shaft 28 and housing 24 in which casing 22 is disposed. With reference to FIG. 2, seal 20 includes a mounting portion 30 having an annular recess 32 therein. A mounting portion 22a of casing 22 resides within annular recess 32. It should be noted that mounting portion 30 and casing 22 can take on many shapes and forms and are not considered to be particularly relevant to the present invention. Mounting portion 30 is mounted to casing 22 which can be made of plastic or metal and mounting portion 30 can be bonded thereto according to well known mounting techniques.

Seal 20 includes a central opening 36 through which shaft 28 is disposed. The diameter of opening 36 is dimensioned to be less than the diameter of shaft 28 to provide a desired fit therebetween. That is, the portion of seal 20 proximate opening 36 will deform as seal 20 is positioned on shaft 28. The deformation of seal 20 is resisted and a fluid-tight seal is formed against shaft 28.

Seal 20 has a conically-shaped sealing portion 40 that extends axially and radially from mounting portion 30. Opening 36 is located in sealing portion 40. Sealing portion 40 has an active side/surface 44 that engages with shaft 28. Sealing portion 40 also includes a non-active side/surface 48 that is opposite active surface 44. Non-active surface 48 does not engage with shaft 28. A leading seal edge or lip 52 separates active surface 44 and non-active surface 48. Active surface 44 is exposed to air side 49 while non-active surface 48 and seal edge 52 are exposed to lubricant (e.g. oil) side 50.

At least one groove 60 (two grooves are shown in FIG. 8) is located on active surface 44 and spirals around shaft 28 with portions 62 of active surface 44 disposed therebetween. Groove 60 extends axially along active surface 44 as it wraps around shaft 28 with portions 62 of active surface 44 disposed therebetween. The pitch of groove 60 can vary and, if desired, may be uniform or constant. Groove 60 can be coined, cut into or otherwise formed along active surface 44.

Groove 60 is a hydrodynamic pumping element. Groove 60 captures lubricant that seeps past seal edge 52 and pumps the captured lubricant back into lubricant side 50. Relative rotation between active surface 44 and shaft 28 causes the lubricant captured within groove 60 to be directed toward lubricant side 50 and past seal edge 52, as described below.

Referring now to FIG. 3, details of active surface 44 and groove 60 therein are shown. Groove 60 can be a single groove that extends helically or spirally along active surface 44 between a beginning point 64 and a termination point 68. Alternatively, as shown in FIG. 8, seal 20 can have multiple grooves 60 that extend helically or spirally along active surface 44. For example, as shown, a first groove 60a can extend from beginning point 64a to termination point 68a while a second groove 60b extends from beginning point 64b to termination point 68b. Grooves 60a, 60b do not intersect one another. Additionally, grooves 60a, 60b spiral along active surface 44 in the same direction. The direction in which grooves 60a, 60b spiral determines the direction in which captured lubricant is routed due to relative rotation between seal 20 and shaft 28. With both grooves 60a, 60b spiraling in the same direction, grooves 60a, 60b provide a unidirectional pumping action such that both grooves 60a, 60b pump lubricant therein in the same direction. While seal 20 is shown as having either one or two grooves 60, it should be appreciated that more than two grooves can be utilized, if desired.

Groove 60 stops short of reaching seal edge 52. Specifically, a static dam 70 is disposed between seal edge 52 and termination point 68. Static dam 70 is adjacent seal edge 52 and is in direct contact with shaft 28 and forms a seal thereagainst. To facilitate the hydrodynamic pumping of leaked lubricant back into lubricant side 50, groove 60 includes two distinct regions or sections 74, 76. First region 74 is referred to as the induction zone while second region 76 is referred to as the booster zone. Induction zone 74 is characterized by groove 60 having a cross-sectional area that is substantially constant. In contrast, booster zone 76 is characterized by having a cross-sectional area that diminishes to zero as groove 60 approaches termination point 68 adjacent static dam 70. In the preferred embodiment, the width W of groove 60 in both induction zone 74 and booster zone 76 is the same while the depth of groove 60 in induction zone 74 is different than the depth of groove 60 in booster zone 76. Specifically, in induction zone 74 the depth of groove 60 is substantially constant while in booster zone 76 the depth of groove 60 diminishes as groove 60 approaches termination point 68.

Thus, the cross-sectional area of groove 60 in induction zone 74 is substantially constant while the cross-sectional area of groove 60 in booster zone 76 approaches zero as groove 60 approaches termination point 68. The changing cross-sectional area of groove 60 in booster zone 76 advantageously facilitates the returning of lubricant from groove 60 back into lubricant side 50, as described below.

Figure 4:
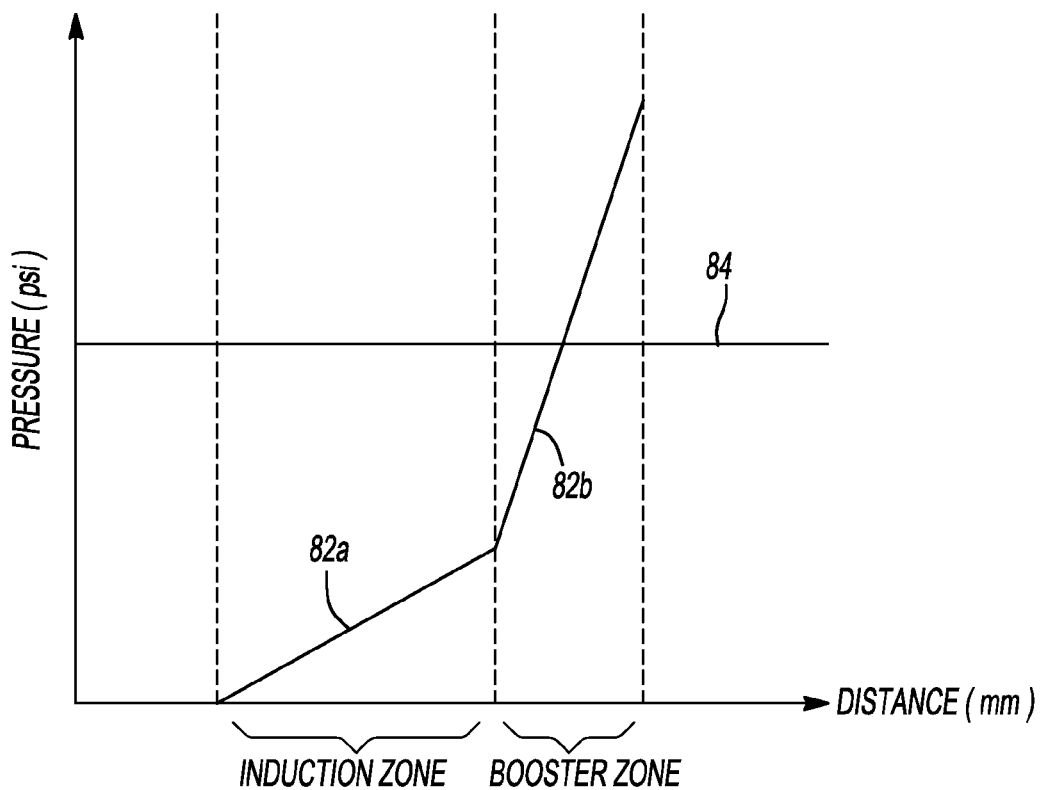
FIG. 4 is a graph of the hypothetical lubricant pressure in the groove as a function of distance for the seal configuration shown in FIG. 3.

Referring now to FIG. 4, a hypothetical example of the fluid pressure (curve 82) within groove 60 as a function of the position within groove 60 is shown. As lubricant is captured by groove 60, the relative rotation between seal 20 and shaft 28 drives the lubricant toward termination point 68. As a result, the fluid pressure within groove 60 increases as termination point 68 is approached. In the groove design of the present invention, the fluid pressure growth (curve 82*a*) in induction zone 74 is at a lower (slower) rate than the fluid pressure growth (curve 82*b*) within booster zone 76. Specifically, due to the substantially uniform cross-sectional area of groove 60 in induction zone 74, the fluid pressure grows at a relatively slow rate which may or may not be a constant rate. When the lubricant enters into booster zone 76, however, the reducing cross-sectional area of groove 60 therein causes the fluid pressure to increase more rapidly as groove 60 approaches termination point 68. The rate of fluid pressure growth in booster zone 76 may be a constant or non-constant rate. Thus, the fluid pressure growth is relatively slow in induction zone 74 and becomes relatively fast in booster zone 76.

Fluid pressure within groove 60 continues to grow until a critical value (the seal lip 52 opening pressure, as represented by line 84) is met or exceeded. As soon as the fluid pressure meets or exceeds the critical value, the fluid pressure build up in booster zone 76 exceeds the seal lip opening pressure and the lubricant is pumped into lubricant side 50. That is, the pressure within booster zone 76 increases to a value which causes static dam 70 to lift off shaft 28 and allow the lubricant within groove 60 to flow back into lubricant side 50. Once the fluid pressure within groove 60 drops below the critical pressure, static dam 70 moves back and seals against shaft 28 and the flow of lubricant from groove 60 into lubricant side 50 ceases. The lubricant will again begin to collect within groove 60 and cause the fluid pressure therein to increase. Once the fluid pressure exceeds the critical value again, static dam 70 will separate from shaft 28 and allow the lubricant within groove 60 to again flow into lubricant side 50 until such time as the fluid pressure drops below the critical value. This process continues throughout operation of seal 20.

The physical shape and dimensions of groove 60 are chosen to provide a pump rate that is equal to or greater than the expected leakage rate of lubricant past seal lip 52 for the expected life of seal 20. That is, during the life of seal 20, the leakage rate past seal lip 52 may increase. The dimensions of groove 60 are chosen to provide a pumping rate that meets or exceeds the expected leakage rate of lubricant past seal lip 52 along with providing a fluid pressure rise that exceeds the critical value to enable the lubricant to be pumped back into the lubricant side of the seal.

Depending upon the leakage rate of lubricant past seal lip 52, a steady state regime of groove 60 discharging lubricant back into lubricant side 50 is possible. That is, depending upon the design of groove 60, the performance of seal lip 52 and the relative rotation between seal 20 and shaft 28, it may be possible for a continuous flow of lubricant to leak past seal lip 52, be captured by groove 60, and transported back to lubricant side 50 by maintaining the pressure within groove 60 adjacent static dam 70 equal to or greater than the critical pressure. Thus, it should be appreciated that the returning of captured lubricant to lubricant side 50 can be a non-steady state occurrence or a steady state occurrence.

The substantially-constant cross-sectional area of groove 60 in induction zone 74 and the decreasing cross-sectional area of groove 60 in booster zone 76 advantageously facilitate the return of captured lubricant to lubricant side 50. The substantially constant cross-sectional area in induction zone 74 allows the fluid pressure within induction zone 74 to gradually increase as the lubricant approaches booster zone 76. The induction zone 74 can be configured so that during nominal operation of seal 20 (that is, with seal 20 experiencing normal anticipated maximum leakage of lubricant past seal lip 52) the critical pressure is not reached. By not reaching the critical pressure within induction zone 74, a greater portion (that portion between induction zone 74 and seal lip 52) of active surface 44 can maintain contact with shaft 28 thereby helping to prevent lubricant from leaking through seal 20. The reducing cross-sectional area of groove 60 in booster zone 76 advantageously increases the fluid pressure within booster zone 76 above the critical pressure 84 in a location that is adjacent static dam 70. The disruption of the contact between static dam 70 and shaft 28 at this location reduces the amount of active surface 44 that is dislodged from intimate contact with shaft 28 during the returning of captured lubricant to lubricant side 50. It should be appreciated that while it is preferred that the cross-sectional area of groove 60 within induction zone 74 be substantially constant, variation in the cross-sectional area is possible. That is, variation in the cross-sectional area that causes a slower rate of fluid pressure increase than in booster zone 76 and/or avoids or minimizes the potential for the fluid pressure therein to exceed the critical pressure can be employed, although all the advantages of the present invention may not be realized.

Figure 5A:
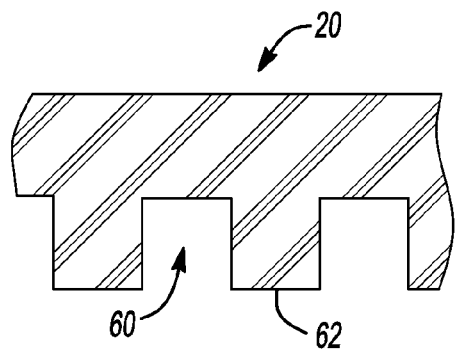
FIGS. 5A-5E are fragmented representations of various alternate cross-sectional configurations or geometry for the grooves used in the seal according to the principle of the present invention.
Figure 5B:
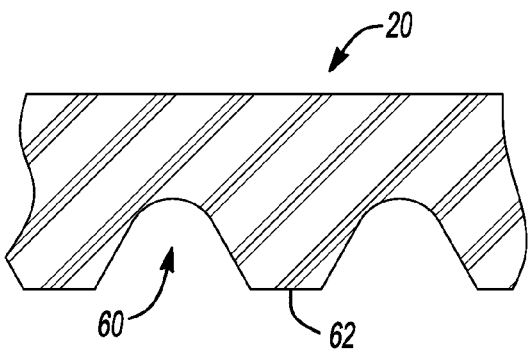
Figure 5C:
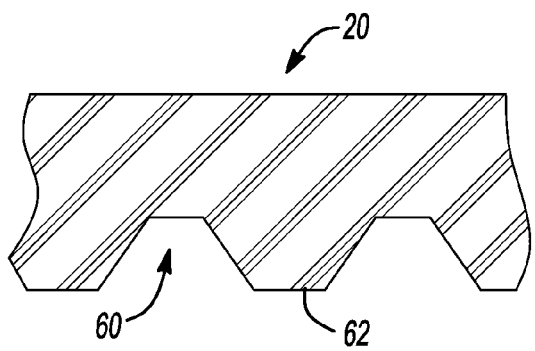
Figure 5D:
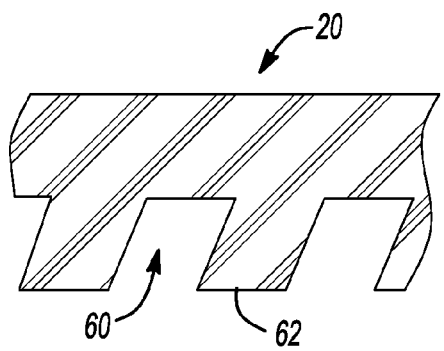
Figure 5E:
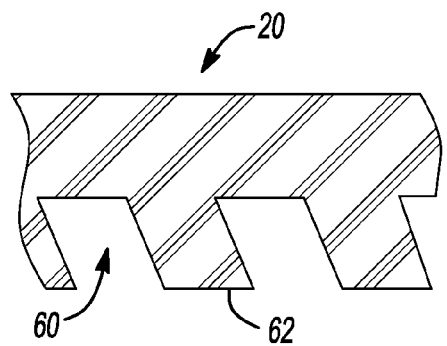

The cross-sectional shape of groove 60 can vary. For example, as shown in FIG. 3, the cross-sectional shape or geometry of groove 60 can be triangular. However, as shown in FIGS. 5A-5E, other geometries or cross-sectional shapes can be employed. For example, the cross-sectional shape can be square or rectangular, as shown in FIG. 5A, curved or rounded, as shown in FIG. 5B, trapezoidal, as shown in FIG. 5C, and/or skewed toward or away from seal lip 52, as shown in FIGS. 5D and 5E, respectively. It should be appreciated that, while it is preferred to keep the cross-sectional area of groove 60 substantially constant in induction zone 74, the geometry of groove 60 can change while maintaining the cross-sectional area substantially constant. That is, if desired, the geometry of groove 60 can change (e.g. triangular to rectangular), while maintaining the cross-sectional area substantially constant and still resulting in a gradual buildup of fluid pressure within induction zone 74. The geometry of groove 60 can also change in booster zone 76 so long as a reduction in the cross-sectional area is achieved and approaches zero at the termination point. Thus, the geometry of groove 60 can change so long as the requirements regarding the cross-sectional area are met.

Referring now to FIG. 6, a first alternate embodiment of a seal 120 according to the principle of the present invention is shown. In seal 120, the decreasing cross-sectional area of booster zone 176 is different than that in the preferred embodiment. Specifically, the depth D of groove 160 in both induction zone 174 and booster zone 176 remains substantially constant. To decrease the cross-sectional area of groove 160 within booster zone 176, the width of groove 160 at the contact plane of active surface 144 decreases as groove 160 approaches termination point 168. The decreasing cross-sectional area of groove 160 in booster zone 176 causes the fluid pressure to increase rapidly in booster zone 176, allowing operation of seal 120 along the same principles discussed above with reference to seal 20. It should be appreciated that the manner in which the cross-sectional area of groove 160 is decreased within booster zone 176 can vary from that shown. For example, a combination of a decreasing depth and a decreasing width of groove 160 can be employed to reduce the cross-sectional area of groove 160 in booster zone 176 as groove 160 approaches termination point 168. Additionally, a changing geometry for groove 160 can also be utilized, as discussed above.

Referring now to FIG. 7, a second alternate embodiment of a seal 220 according to the principles of the present invention is shown. In this embodiment, a booster zone is not utilized. Rather, groove 260 ends at termination point 268 with static dam 270 disposed between termination point 268 and seal lip 252. The cross-sectional area of groove 260 is generally uniform throughout its length. As a result, the fluid pressure within groove 260 builds at a gradual pace until eventually overcoming the critical pressure (the opening pressure of seal lip 252) and directing the captured lubricant back to the lubricant side 50. The design of groove 260 is configured to ensure that the fluid pressure within groove 260 at termination point 268 exceeds the critical pressure while maintaining a sufficient pump rate to route captured lubricant back to lubricant side 50. Thus, in this embodiment, the active surface 244 includes a groove 260 that has a termination point 268 that stops short of reaching seal lip 252, thus forming a static dam 270 therebetween. It should be appreciated that while the second alternate embodiment is operable to return lubricant to the lubricant side 50 of seal 220, all the benefits of using the preferred embodiment may not be realized.

Seals 20, 120, 220 can be made from a variety of material compositions. For example, the dynamic seal can include plastic, rubber, or any of a wide variety of known elastomers, such as PTFE, TPE (thermoplastic elastomers), TPV (thermoplastic volcanizates), and Flouroprene™ material, a composition described in U.S. Pat. No. 6,806,306, among others.

The seal according to the principles of the present invention has many advantages. Firstly, static leakage and problems associated with insufficient fluid flow (coking, carbonization, etc.) are easily controlled by appropriately adjusting the design parameters, and, therefore, providing a reliable sealing function. Another advantage is that some amount of lubricant is always present in the groove prior to liftoff of the static dam from the shaft. This lubricant provides improved seal lip lubrication thereby reducing wear, effectively removing coked lubricant and the wear debris, which in turn extends seal life. Thus, the seal according to the principle of the present invention provides many advantages.

While the present invention has been described and illustrated with reference to specific embodiments, it should be appreciated that these embodiments are merely exemplary in nature and that variations that depart from the embodiment shown are intended to be within the scope of the present invention. For example, while a variety of geometries are shown for the cross-sectional configuration of the groove, it should be appreciated that these cross-sectional geometries are merely exemplary and that other cross-sectional geometries can be employed. The shape of portions 62, 162, 262 of active surface 44, 144, 244 can vary. For example, portions 62, 162, 262 can have a width that varies and may be reduced to, or be, a point, if desired. Additionally, while the seal has been shown with reference to a particular sealing portion 40, mounting portion 30 and casing 22, it should be appreciated that these are merely exemplary and that other configurations that allow an active surface of a seal to engage with a shaft can be employed. Moreover, seal 20, 120, 220 does not need to seal against the outer diameter of shaft 28. Rather, seal 20, 120 220 can have an active surface 44, 144, 244 that seals against a component attached to shaft 28, such as a flat area or surface of an axial slinger or flange. Such applications may provide a pumping action in the radial direction. Furthermore, while the depiction of multiple grooves in FIG. 8 shows that the termination and ending points for the respective grooves are directly across from one another, it should be appreciated that they do not need to have such relative positioning and can be skewed from one another. Moreover, it should be appreciated that the dimensions shown herein for seal 20, are merely exemplary to facilitate an understanding of the principles and functionality of the present invention. As such, the dimensions shown herein can vary without deviating from the spirit and scope of the present invention. Additionally, while particular materials of construction have been disclosed as being suitable for use in the seal, it should be appreciated that such a list is merely illustrative and not exhaustive of the types of materials that can be used to form a seal according to the principle of the present invention. Furthermore, it should be appreciated that while the pumping element is described as grooves, the use of raised ribs on the active surface of the seal may also be utilized in lieu of the grooves although all of the benefits of the present invention may not be realized. Moreover, it should be appreciated that while shaft 28 is described as being a rotary shaft, shaft 28 could be stationary and seal 20 could rotate about shaft 28.

Figure 9:
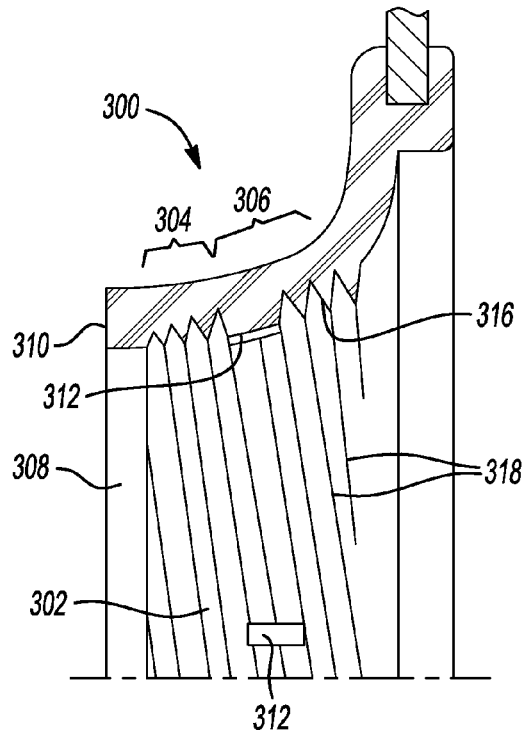
FIG. 9 is a cross-sectional view of a seal having spiral grooves with an induction zone and a booster zone and having bars extending across the grooves.

According to a further aspect of the present disclosure as shown in FIG. 9, the seal lip 300 includes a plurality of spiral grooves 302 that define an induction zone 304 and a booster zone 306 in the same manner as described above with reference to FIG. 3. The booster zone 306 is disposed adjacent to a static band 308 disposed at the end 310 of the seal lip 300 facing the oil side. The seal lip 300 is provided with at least one bar 312 extending generally axially across at least one of the spiral grooves 302. According to one aspect of the present disclosure, a plurality of bars 312 are provided and can include one bar 312 for each of the plurality of spiral grooves 302 used in the spiral groove configuration. The bars 312 are spaced axially away from the static band 308 and can be axially spaced from the booster zone 306 to thereby prevent contaminants from reaching and becoming trapped in the booster zone 306 and/or against the static band 308. The bars 312 can also prevent static leakage when the shaft is not rotating, and provide improved pumping efficiency of the spiral grooves.

Figure 10:
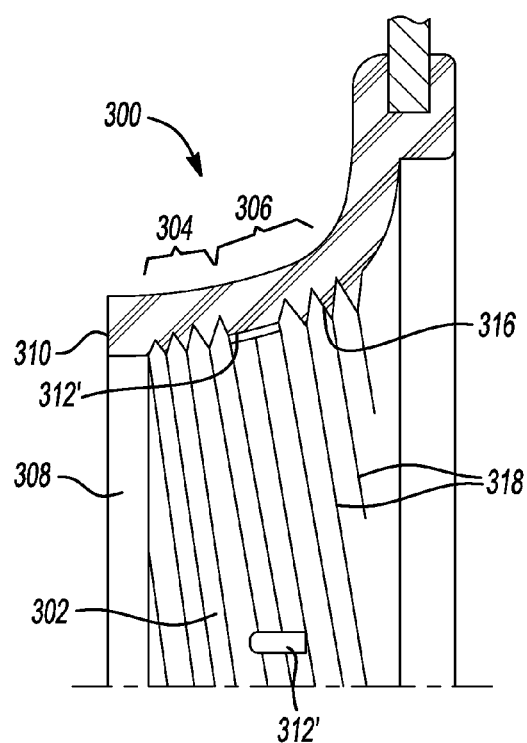
FIG. 10 is a cross-sectional view of a seal similar to FIG. 9 with the bars being shorter than the peaks defining the spiral grooves.
Figure 11:
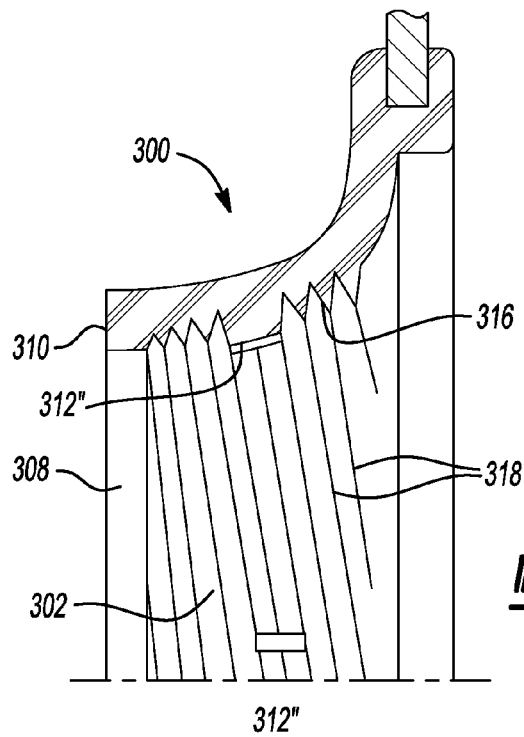
FIG. 11 is a cross-sectional view of a seal similar to FIG. 9 with the bars being taller than the peaks defining the spiral grooves.

As shown in FIG. 9, the grooves 302 are defined by a valley 316 disposed between two opposite peaks 318. The bars 312 can have an equal height as, or being flush with, the peaks 318. Alternatively, the bars 312' can have a smaller height than, or recessed relative to, the peaks 318, as illustrated in FIG. 10, or the bars 312" can have a greater height than extend above the peaks 318, as illustrated in FIG. 11.

Thus, variations that do not depart from the gist of the invention are intended to be within the scope of the invention. Such variations are not to be regarded as a departure from the spirit and scope of the invention.

What is claimed is:

1. A seal, comprising:
    a mounting portion, and
    a seal lip extending radially inward from said mounting portion, said seal lip including a plurality of spiral grooves defining an induction zone wherein the spiral grooves in said induction zone have a generally constant cross-section and a booster zone disposed between said induction zone and a static band disposed at an end of said seal lip facing an oil side of the seal, said spiral grooves in said booster zone having a decreasing cross-section extending axially from said induction zone toward said static band, a plurality of bars extending across said plurality of spiral grooves within said induction zone, without hindering operation of said booster zone.

2. The seal according to claim 1, wherein a number of said plurality of bars equals a number of said plurality of spiral grooves.

3. The seal according to claim 1, wherein said plurality of spiral grooves are defined by a valley disposed between a pair of opposite peaks, said bars having a height equal to a height of said peaks.

4. The seal according to claim 1, wherein said plurality of spiral grooves are defined by a valley disposed between a pair of opposite peaks, said bars having a height greater than a height of said peaks.

5. The seal according to claim 1, wherein said plurality of spiral grooves are defined by a valley disposed between a pair of opposite peaks, said bars having a height shorter than a height of said peaks.

* * * * *